United States Patent
Clearwaters et al.

[11] 3,906,431
[45] Sept. 16, 1975

[54] SEARCH AND TRACK SONAR SYSTEM

[75] Inventors: Walter L. Clearwaters, Waterford; Frederick J. Kingsbury, Guilford; Carlyle E. Shippey, Jr., Waterford; John W. Soderberg, Niantic, all of Conn.

[73] Assignee: The United States of America as represented by the Secretary of the Navy, Washington, D.C.

[22] Filed: Apr. 9, 1965

[21] Appl. No.: 447,612

[52] U.S. Cl. .............................................. 340/6 R
[51] Int. Cl.$^2$ .......................................... G01S 3/80
[58] Field of Search ................... 200/5–9, 24–26, 200/164; 340/6, 16; 343/113

[56] References Cited
UNITED STATES PATENTS

| | | | |
|---|---|---|---|
| 1,995,708 | 3/1935 | Fischer | 340/6 |
| 2,808,583 | 10/1957 | Mathes | 343/113 |
| 3,040,310 | 6/1962 | Hausz | 343/7 |
| 3,160,850 | 12/1964 | Dudley | 340/6 |

FOREIGN PATENTS OR APPLICATIONS

| | | | |
|---|---|---|---|
| 566,823 | 12/1932 | Germany | 340/16 |

*Primary Examiner*—Richard A. Farley
*Attorney, Agent, or Firm*—Richard S. Sciascia; Arthur A. McGill; Prithvi C. Lall

EXEMPLARY CLAIM

1. A tracking sonar system comprising:
   a plurality of essentially identical hydrophones,
   a rigid framework supporting the hydrophones in approximately equally spaced relationship, equidistant from a common locus point and identically oriented relative to the locus point,
   a plurality of essentially identical brush contacts, one for each of said hydrophones,
   signal transfer means coupling each hydrophone to a brush contact,
   a second rigid framework supporting the brush contacts in an assembled relationship equidistant from and radially to a second common locus point and having geometric distribution about the second locus point corresponding to the geometric distribution of the corresponding hydrophones about the first locus point,
   a beam forming member having a convex smooth spherical surface sector defining a solid angle which is a minor fraction of the solid angle defined by said brush contacts, for wiping engagement with said brush contacts,
   said beam forming member including a series of coaxial conductor rings insulated from each other, each of said rings comprising four identical substantially 90° arcuate segments insulated from one another and together comprising part of the convex smooth spherical surface sector, said ring segments being arranged in four quadrants,
   means supporting said beam forming member for arcuately displacing the beam forming member about a first axis of the brush contact assembly that passes through the locus of the brush contacts and parallel to one of the two mutually perpendicular quadrant boundaries and for arcuately displacing the beam forming member about a second axis parallel to the other of the two mutually perpendicular quadrant boundaries and which intersects the first axis at the locus of the brush contacts and which is arcuately displaceable together with the beam forming member about the first axis,
   means for combining signal energies from the conductor segments in each quadrant in a predetermined time relationship,
   means for comparing the combined signal energies from the four quadrants, and
   means responsive to the signal comprising means to locate the beam forming member for minimum differences among the outputs from the four quadrants.

1 Claim, 7 Drawing Figures

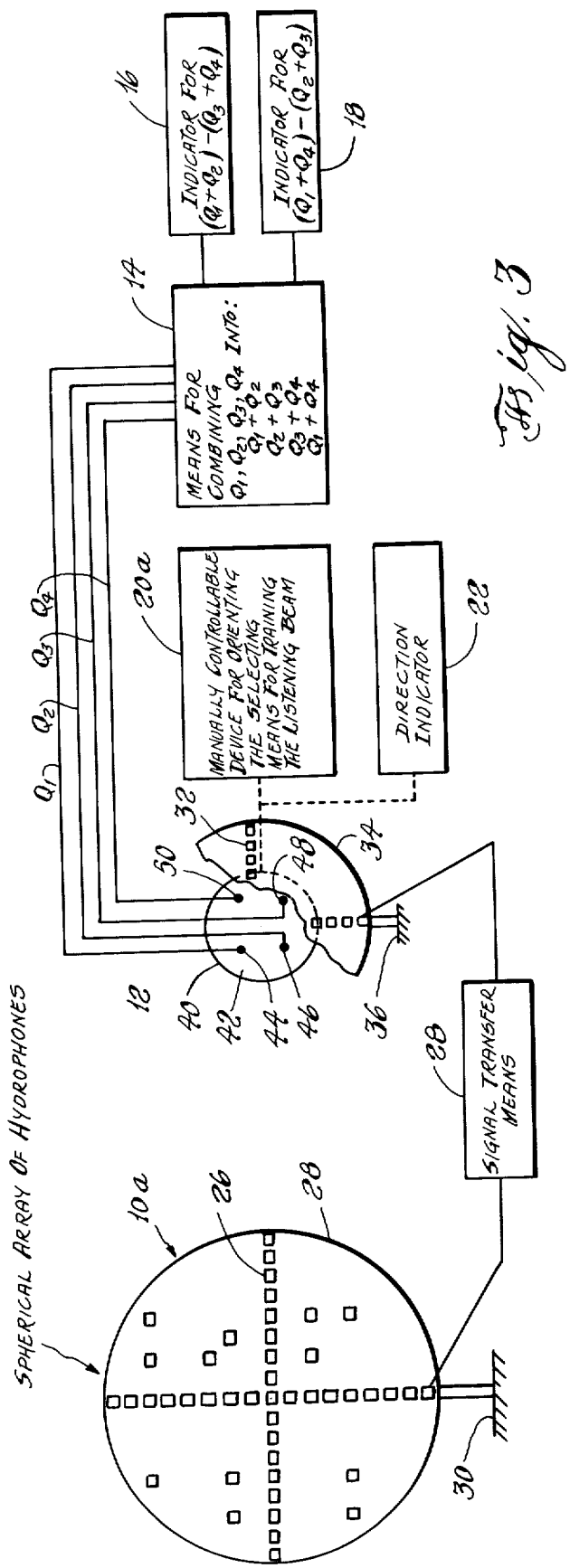

INVENTORS.
WALTER L. CLEARWATERS
FREDERICK J. KINGSBURY
CARLYLE E. SHIPPEY, JR.
JOHN W. SODERBERG
BY

ATTORNEY

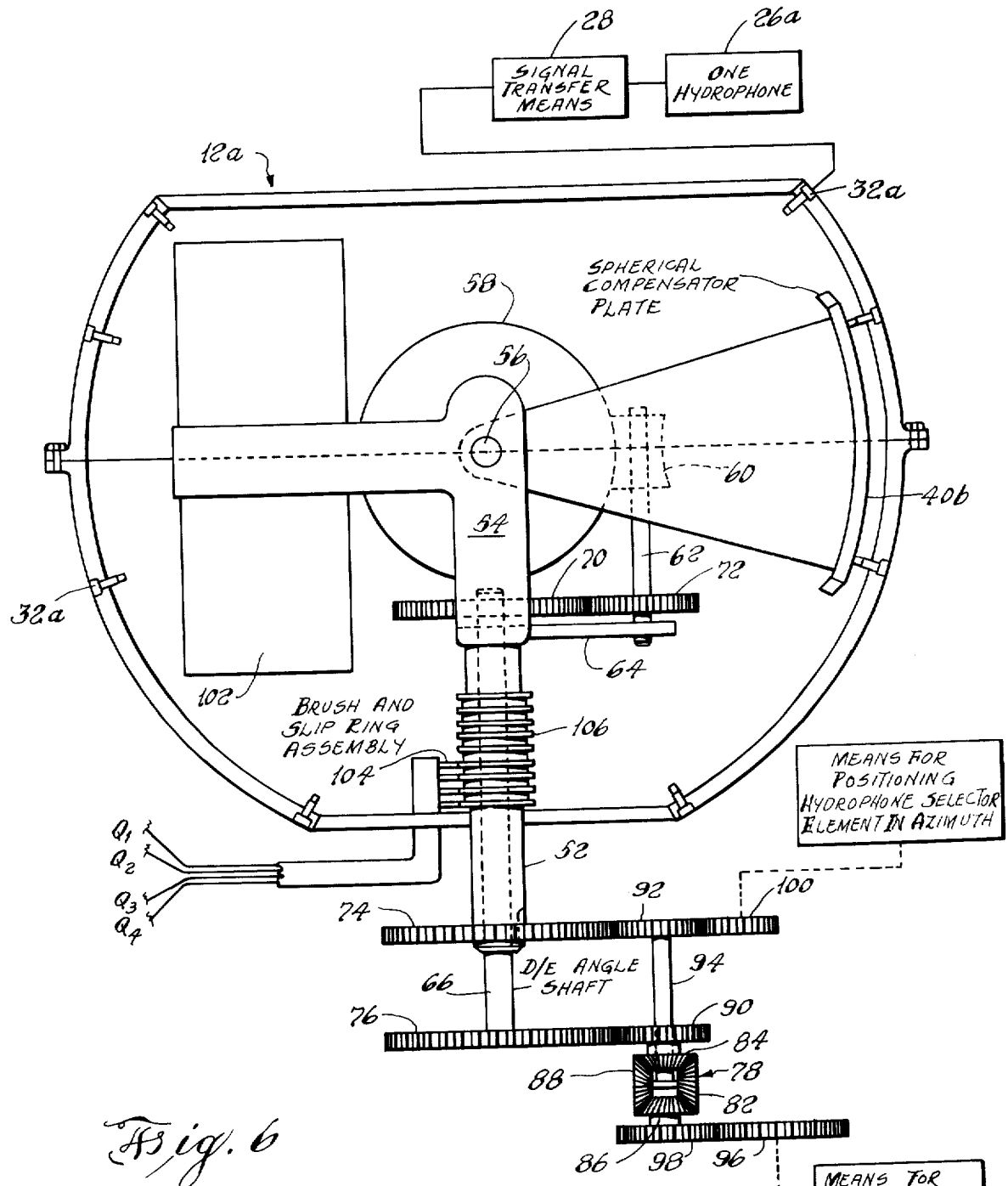

SEARCH AND TRACK SONAR SYSTEM

The invention described herein may be manufactured and used by or for the Government of the United States of America for governmental purposes without the payment of any royalties thereon.

This invention relates to directional underwater listening systems and more particularly to searching for and tracking an underwater target in both azimuth and depression-elevation (D/E).

An object of this invention is to provide an underwater directive listening beam for passive or active listening that is trainable in azimuth and in D/E for searching and tracking.

A further object is to provide an underwater directive listening beam for passive or active listening that is trainable up to 360° in azimuth and over a substantial part of 180° in D/E.

A further object is to provide an underwater directive listening beam for passive or active listening that can track automatically in both azimuth and D/E.

A further object is to provide an underwater directive listening beam for passive or active listening that is controllable manually for tracking in both azimuth and D/E.

A further object is to provide an underwater directive listening system having a directive listening beam that is trainable in both azimuth and D/E.

A further object is to provide an acoustic underwater target tracking system generally superior to those in the prior art.

Other objects and advantages will appear from the following description of an example of the invention, and the novel features will be particularly pointed out in the appended claims.

This invention is related to the invention disclosed in copending patent application, Ser. No. 320,580, for Electrically Steerable Sonar System, filed Oct. 31, 1960, by Walter L. Clearwaters and Lloyd T. Einstein and is also related to the invention disclosed in copending patent application Ser. No. 360,181 for Electrically Steerable Spherical Hydrophone Array, filed Apr. 10, 1964 by Walter L. Clearwaters, Lloyd T. Einstein, Paul F. Radics, Jr. and John W. Soderberg; both copending patent applications are assigned to the United States Government, the assignee of this application.

FIG. 3 is a more specific embodiment of the invention illustrated in FIG. 1,

Figure 7:
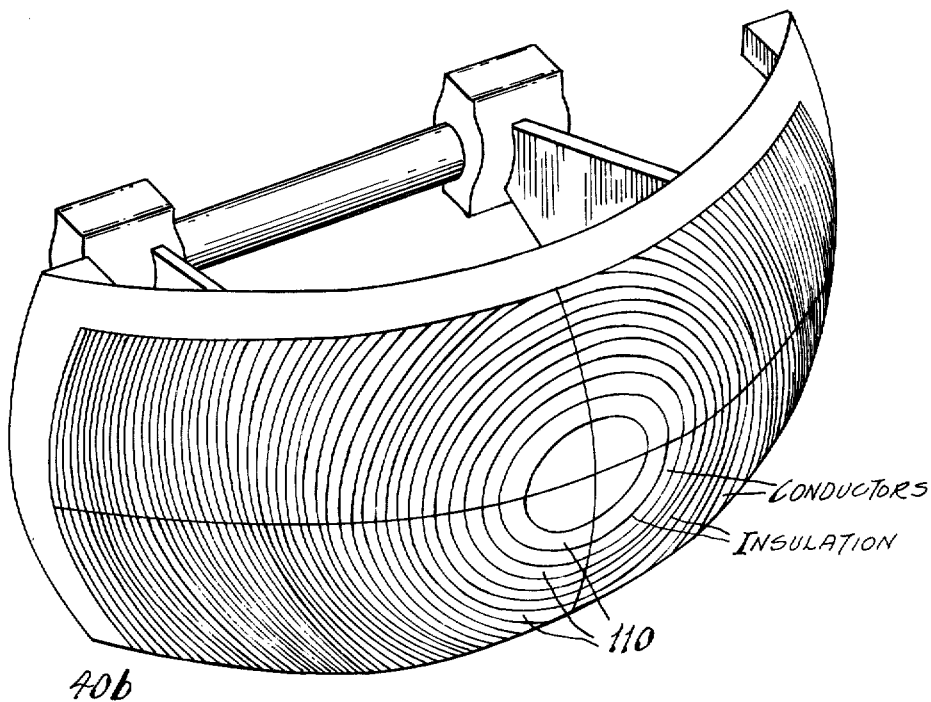
Figure 5:
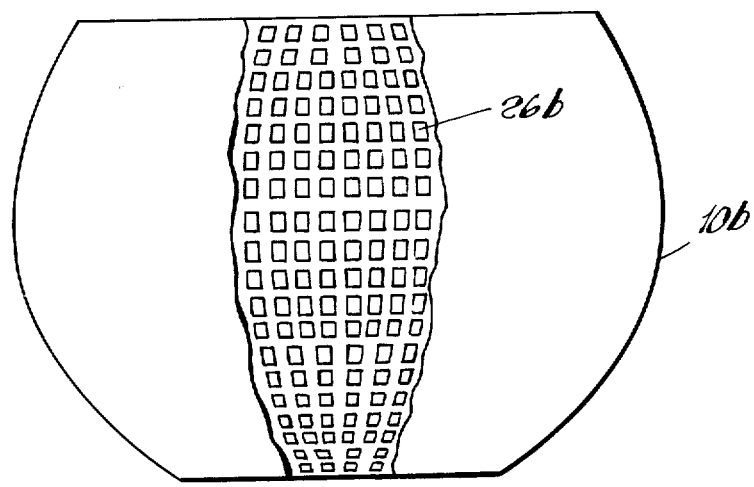

FIGS. 4 and 7 show hydrophone-selecting beam-forming elements for use in place of the corresponding element shown in FIG. 3, FIG. 5 shows a truncated spherical hydrophone array for use in place of the spherical array in FIG. 3, and FIG. 6 shows in combination a brush assembly, a hydrophone-selecting beam-forming element, and apparatus for training the hydrophone selecting beam-forming element for use in the system shown in FIG. 3 having a hydrophone array as shown in FIG. 5.

Figure 1:
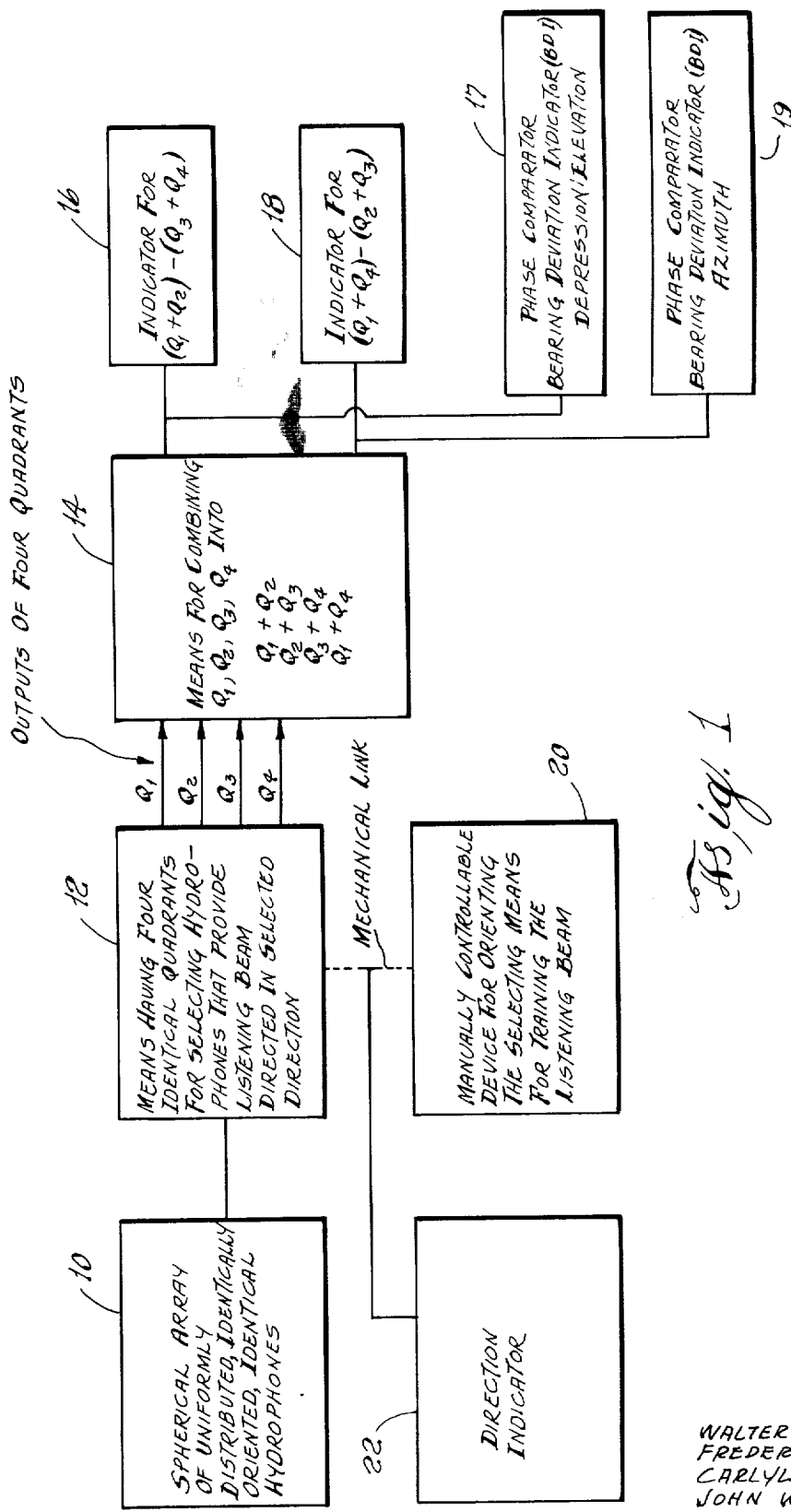
FIGS. 1 and 2 are block diagrams of the broad aspects of this invention.
Figure 2:
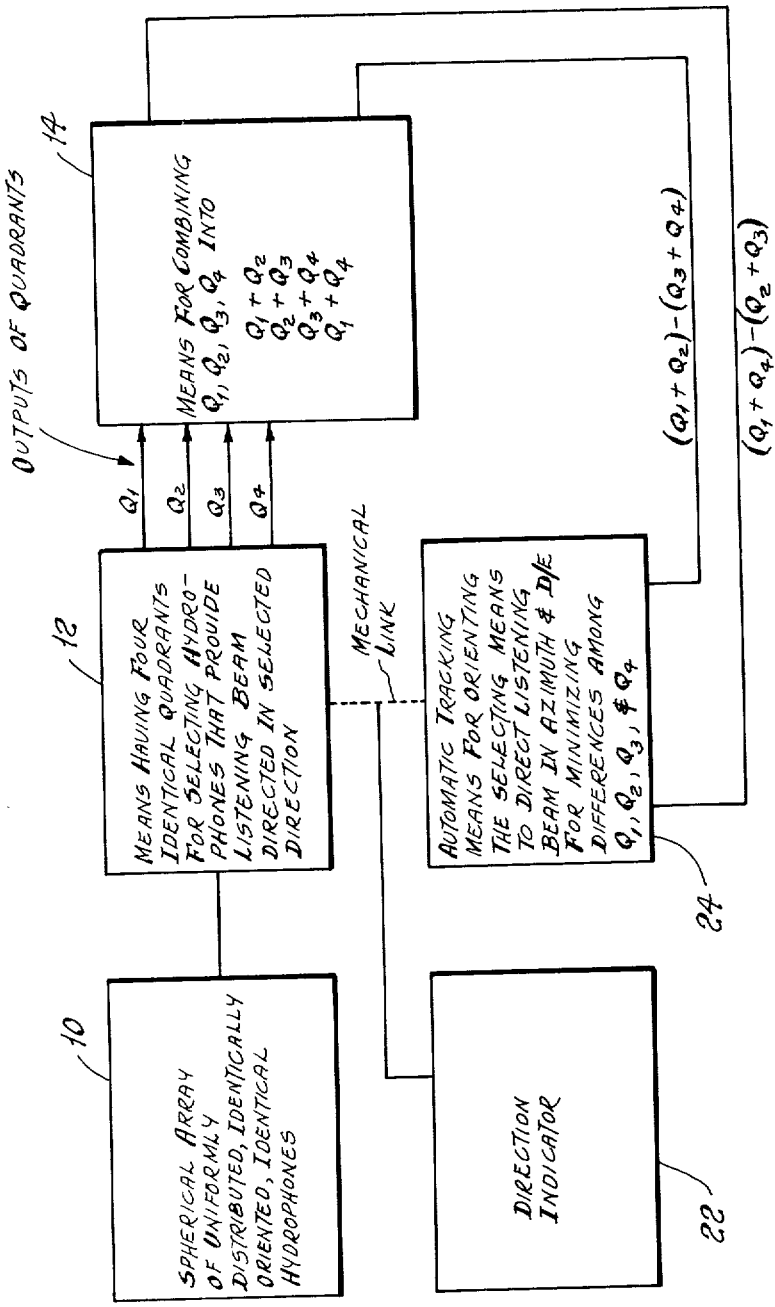

The embodiments shown in FIGS. 1 and 2 each include a spherical array 10 of hydrophones as shown and described in application Ser. No. 320,580 and 360,181, including identical hydrophones uniformly distributed spherically and identically oriented with respect to the spherical center. The term hydrophones refers to the listening functions of project-listen devices as well as to listen-only devices. The term spherical as used herein takes in a full spherical array as well as any geometric subdivision of a spherical array, e.g., a truncated spherical array. A means 12 is operable to select a group of the hydrophones of the array for forming a listening beam directed in a selected direction. Because of uniformity in the spherical array and because the hydrophone selecting means selects hydrophones of the array in a predetermined geometric distribution, the configuration of the listening beam is essentially independent of the listening beam direction. The hydrophone selecting means has four symmetrical quadrants and combines the outputs of the selected hydrophones in each quadrant. If the beam is on target, the outputs $Q_1$, $Q_2$, $Q_3$, $Q_4$ of the four quadrants are equal and in phase or the differences among them are minimal. A means 14 pairs the outputs of the quadrants of the hydrophone selecting means in four combinations $(Q_1+Q_2)$, $(Q_2+Q_3)$, $(Q_3+Q_4)$, and ($Q_1$ and $Q_4$). In FIG. 1, $(Q_1+Q_2)$ and $(Q_3+Q_4)$ are coupled to an indicator 16 for obtaining the difference intensity and to a phase comparator 17 for obtaining bearing deviation indication (BDI) in depression/deviation, and $(Q_1+Q_4)$ and $(Q_2+Q_3)$ are coupled to an indicator 18 for obtaining the difference in intensity and to a phase comparator 19 for obtaining bearing deviation indication (BDI) in azimuth. A manually controllable device 20 is operable to orient the selecting means for training the listening beam. A beam direction indicator 22 is mechanically coupled to the hydrophone selecting means 12. An operator controls the device 20 to minimize the magnitudes of the indications on indicators 16 and 18 and phase comparators 17 and 19. In FIG. 2, an automatic tracking means 24 responds to $(Q_1+Q_2) - (Q_3+Q_4)$ and to $(Q_1+Q_4) - (Q_2+Q_3)$ to orient the selecting means to direct the listening beam in azimuth and D/E for minimizing $(Q_1+Q_2) - (Q_3+Q_4)$ and $(Q_1+Q_4) - (Q_2+Q_3)$.

A more detailed embodiment of the invention shown in FIG. 3 includes a spherical array 10$a$ of hydrophones having a large number of identical hydrophones 26, only a few of which are shown, mounted close together on a rigid framework 28 fixedly secure to a ship or to the sea bottom shown symbolically at 30. The hydrophones 26 of the array are substantially uniformly distributed and also are identically oriented relative to the center of the array, i.e., they all have the same sensing portion directed outward relative to the center of the array.

It is advantageous but not essential that the hydrophones have narrow sensing beam angles. A device of the type described in patent application Ser. No. 56,611, filed Sept. 16, 1960, by Edwin J. Parssinen et al. and assigned to the U.S. Government, is one example of a unit suitable for the array described, but others described in the patent literature may be used.

A plurality of identical contact brushes 32 equal to the number of hydrophones are secured to a rigid spherical framework 34 secured in place as at 36. The contact brushes are oriented so that their contact surfaces are directed radially and are equidistant from a common locus point. Identical signal transfer means 38, only one of which is shown, couple each hydrophone to a contact brush. The signal transfer means 38 may include a preamplifier, selective bandpass filters, matching elements, etc. The contact brushes are geometrically distributed relative to one another about their common locus point as the respective hydrophones to which they are connected are distributed relative to one another about their common locus point. It is not essential that the hydrophone array taken as a unit and the contact brush assembly taken as a unit be identically oriented. The contact brushes may be mounted so that their contact surfaces are directed radially outward or radially inward; the apparatus is simpler if the contact surfaces are directed radially inward. The contact brush assembly is in a sense a model of the hydrophone array.

A hydrophone-selecting beam-forming member 40 having a smooth convex wiping surface is supported inside the framework 34 for arcuate displacement about the locus of the contact brushes for wiping engagement with the contact brushes. The member 40 has a base or matrix 42 of insulating material supporting an integral number of sets of four identical conductors in the insulating material with surface area exposed and forming part of the spherical surface. In FIG. 3, the beam forming element includes only one set of four conductors, 44, 46, 48 and 50 large enough to contact one brush each. The four conductors are symmetrical about a point on the spherical surface of the hydrophone-selecting beam-forming element. The four conductors may be arcuate as shown in FIG. 4 wherein four arcuate conductors, 44a, 46a, 48a and 50a in a matrix of insulating material 42a each span slightly less than 90° so that together they define a ring with four equally spaced gaps, to engage several contact brushes each. The four contacts are in four identical quadrants of the member 40. The listening beam is on target when differences among the outputs $Q_1$, $Q_2$, $Q_3$, $Q_4$ of the four quadrants are minimal. The invention makes use of the fact that when the beam is on target, the difference between $(Q_1+Q_2)$ and $(Q_3+Q_4)$ and the difference between $(Q_1+Q_4)$ and $(Q_2+Q_3)$ are minimal; higher signal output levels are compared relative to comparisons among $Q_1$, $Q_2$, $Q_3$ and $Q_4$. A hydrophone selecting mechanism 12a for a truncated spherical array as in FIG. 5 is shown in FIG. 6. It includes contact brushes 32a supported on a spherical framework 34a. Only a sampling of the contact brushes are shown. A hollow azimuth shaft 52 extends into the spherical framework 34a; its axis intersects the center of the spherical framework. The shaft 52 carries a yoke and gear support 54. A D/E axle 56 is journaled in the yoke 54. The axis of axle 56 is normal to the axis of shaft 52 and intersects the center of the spherical framework 34a. A spherical hydrophone selecting element 40b is supported by the axle 56 within and concentric with the spherical framework 34a. A worm gear 58 is secured to axle 56; a worm 60 in meshing engagement with gear 58 is carried by a shaft 62 rotatably mounted in support 64 which is secured to yoke 54. A shaft 66 extends coaxially through shaft 52 and is rotatable relative to shaft 52. Bearings and conventional devices for locking the shafts against longitudinal displacement are omitted. Shaft 66 carries at its upper end a gear 70 that meshes with a gear 72 secured on worm shaft 62. Shafts 52 and 66 are rotatable independently of one another. A gear 74 is secured to the lower end of shaft 52 and a gear 76 is secured to the lower end of shaft 66. A differential gear box assembly 78 is secured in place near the lower ends of shafts 52 and 66, and includes opposed bevel gears 88 and 82, and opposed bevel gears 84 and 86. Bevel gears 88 and 82 are linked by a shaft relative to which both bevel gears are rotatable. Gears 84 and 90 are joined for rotation together. A gear 92, coaxial with gears 84 and 90 is carried by a shaft 94, and is rotatable independently of gears 84 and 90. The elevation shaft 66 is rotatable independently of azimuth shaft 52 by a gear 96 in meshing engagement with gear 98, the latter being secured to bevel gear 86 of the differential unit. Means for positioning the hydrophone selector element 40b in azimuth is coupled to gear 100 and means for positioning the element 40b in D/E is coupled to gear 96. The two positioning means are independent; they may be manual devices and they may be servomechanisms. The signals from element 40b are coupled to the signal processing circuits 102 carried by the yoke 54 and are brought out by brushes 104 and slip rings 106.

The hydrophone selector element 40b in FIG. 6 may be used in FIG. 3. A more practical design for the hydrophone selector 40b is shown in FIG. 7 and includes four identical quadrants having identical sets of coaxial arcuate conductors 110; the corresponding conductors in the four quadrants are aligned. Each conductor is insulated from every other conductor. The widths of the conductors are such that their projections to the axis are of equal width. Spacings between consecutive conductors are equal. The hydrophones selected by the element 110 are grouped by the conductors to selected equal time increments referred to the passage of a wavefront through the hydrophone array. Assuming that the hydrophone selector 40b has directed the listening beam toward a sound source, the outputs of the hydrophones in each quandrant intercepting the wavefront at about the same instant are combined. For this purpose the circuits 102 are provided with four identical delay lines, not shown, the bars of each quadrant connected to one of the delay lines to bring the signals on the bars of each quadrant into step when the listening beam is directed toward the sound source. The outputs of the four quadrants are combined as in FIGS. 1 and 3. Once a target is selected, automatic tracking means as in FIG. 2, using conventional servomechanisms for azimuth and for D/E, may be used to orient the hydrophone selector.

It will be understood that various changes in the details, materials, and arrangements of parts (and steps), which have been herein described and illustrated in order to explain the nature of the invention, may be made by those skilled in the art within the principle and scope of the invention as expressed in the appended claims.

What is claimed is:

1. A tracking sonar system comprising:
   a plurality of essentially identical hydrophones,
   a rigid framework supporting the hydrophones in approximately equally spaced relationship, equidistant from a common locus point and identically oriented relative to the locus point,
   a plurality of essentially identical brush contacts, one for each of said hydrophones,
   signal transfer means coupling each hydrophone to a brush contact,
   a second rigid framework supporting the brush contacts in an assembled relationship equidistant from and radially to a second common locus point and having geometric distribution about the second locus point corresponding to the geometric distribution of the corresponding hydrophones about the first locus point, a beam forming member having a convex smooth spherical surface sector defining a solid angle which is a minor fraction of the solid angle defined by said brush contacts, for wiping engagement with said brush contacts, said beam forming member including a series of coaxial conductor rings insulated from each other, each of said rings comprising four identical substantially 90° arcuate segments insulated from one another and together comprising part of the convex smooth spherical surface sector, said ring segments being arranged in four quadrants, means supporting said beam forming member for arcuately displacing the beam forming member about a first axis of the brush contact assembly that passes through the locus of the brush contacts and parallel to one of the two mutually perpendicular quadrant boundaries and for arcuately displacing the beam forming member about a second axis parallel to the other of the two mutually perpendicular quandrant boundaries and which intersects the first axis at the locus of the brush contacts and which is arcuately displaceable together with the beam forming member about the first axis, means for combining signal energies from the conductor segments in each quadrant in a predetermined time relationship, means for comparing the combined signal energies from the four quadrants, and means responsive to the signal comparing means to locate the beam forming member for minimum differences among the outputs from the four quadrants.

* * * * *